A. L. McNAGHTEN.
ARMOR FOR PNEUMATIC TIRES.
APPLICATION FILED JUNE 24, 1915.
1,202,200.
Patented Oct. 24, 1916.
2 SHEETS—SHEET 1.
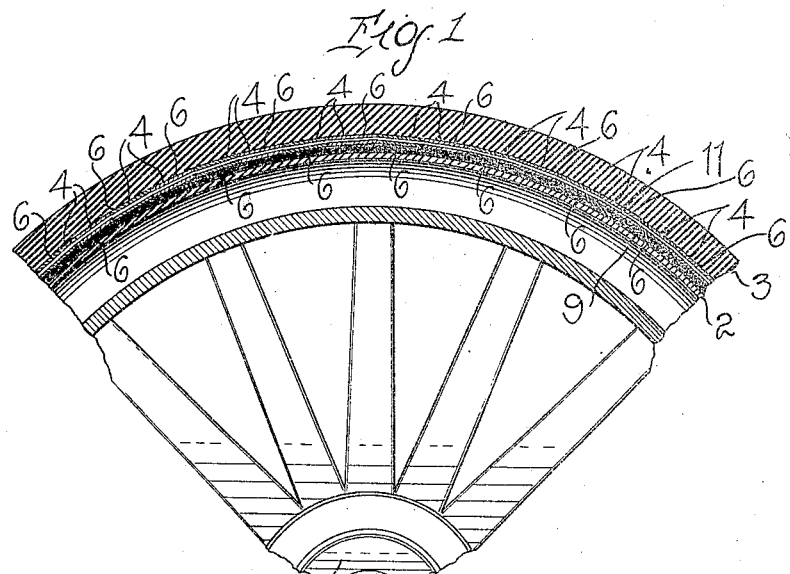
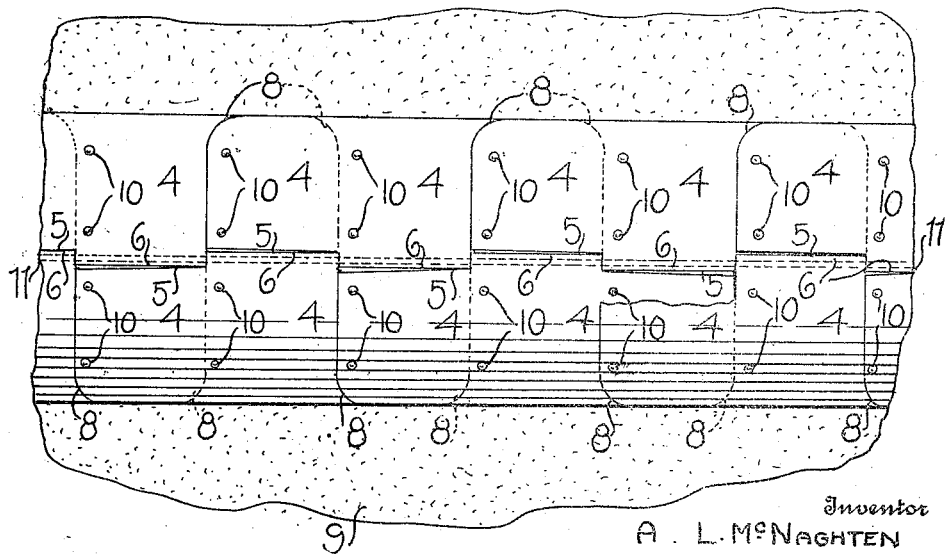

A. L. McNAGHTEN.
ARMOR FOR PNEUMATIC TIRES.
APPLICATION FILED JUNE 24, 1915.
1,202,200.
Patented Oct. 24, 1916.
2 SHEETS—SHEET 2.
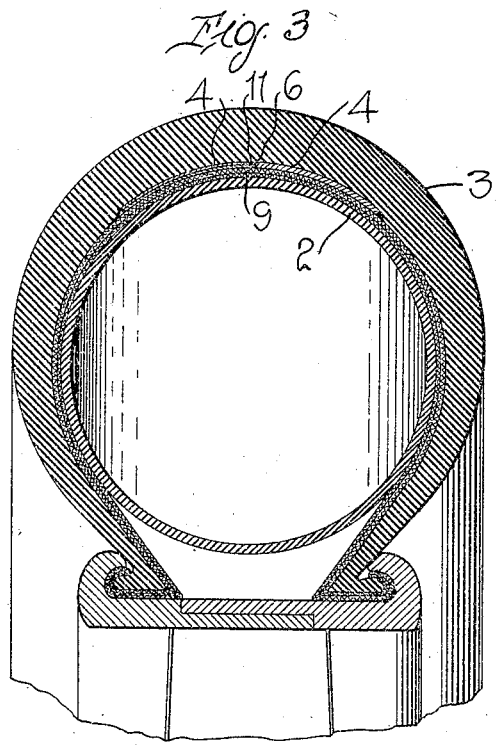
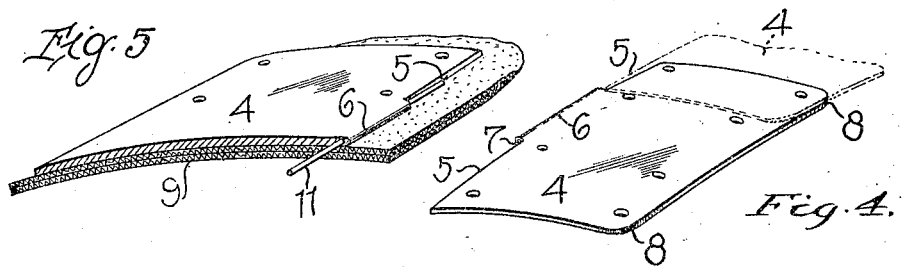
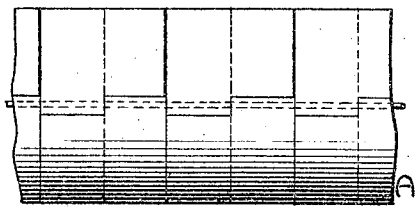
Inventor
A. L. McNAGHTEN
Witnesses
Robert M. Sutphen
A. S. Hint
By Watson E. Coleman
Attorney

UNITED STATES PATENT OFFICE.

ASCHER L. McNAGHTEN, OF ABERDEEN, SOUTH DAKOTA.

ARMOR FOR PNEUMATIC TIRES.

1,202,200.　　　　Specification of Letters Patent.　　Patented Oct. 24, 1916.

Application filed June 24, 1915. Serial No. 36,101.

*To all whom it may concern:*

Be it known that I, ASCHER L. McNAGHTEN, a citizen of the United States, residing at Aberdeen, in the county of Brown and State of South Dakota, have invented certain new and useful Improvements in Armors for Pneumatic Tires, of which the following is a specification, reference being had to the accompanying drawings.

My invention relates to certain new and useful improvements in tire armor, and the general object of the invention is the provision of a tire armor of such a flexible construction that it will yield sufficiently to the movement of the tire shoe as to secure the full resilience of the pneumatic tire and at the same time prevent the tire from being readily punctured or otherwise injured.

A further object of the invention is to provide a tire armor adapted to be disposed between an inner tube and the shoe or casing of the tire and which may be readily put in place by deflating the inner tube and held in place when the inner tube is inflated.

My invention is illustrated in the accompanying drawings, wherein:

Figure 1 is a vertical section of a portion of a pneumatic tire with my armor applied thereto; Fig. 2 is a plan view of the armor and supporting strip; Fig. 3 is a transverse section of a pneumatic tire with my armor applied thereto; Fig. 4 is a detail perspective view of one of the armor plates detached: Fig. 5 is a perspective detail view of a modification of the armor plate; Fig. 6 is a face view of a modified arrangement of the tire; and Fig. 7 is a longitudinal section of the construction shown in Fig. 6.

Similar reference numerals indicate like parts in the several figures of the drawings.

1 represents a part of an ordinary wheel to the rim of which is secured an ordinary inflatable inner tube 2 and the usual shoe 3.

The armor as shown in Fig. 4 consists of a series of plates 4 which if composed of thin metal as shown in Fig. 4, are cut away as seen at 5 and the portion 6 returned to form a hinge bead 7, but if made of thick or heavy metal as shown in Fig. 5 the extended portion is drilled or otherwise formed with a longitudinal channel for the passage of a pintle 11, hereinafter more particularly referred to.

The bead portion 7 is at the middle of the plate, and is one-third the total length of the plate. The outside corners of the plate are rounded as shown at 8, for a purpose presently referred to. As stated before, the bead 7 is medially disposed and has a length equal to a third of the length of the plate and the edges of the cut away portions 5 are inclined laterally with relation to the edge of the bead so that when the plates or pieces are molded to fit the tire the edges of the abutting plates will fit against and work together as a hinge. If these edges were left straight, that is, parallel to the outer edges of the plate, the conjoined edges of the two plates would not fit but would be too close together and would not work properly as a hinge. The amount of slant given to the edges of the cut away portions 5 will of course depend upon the curve of each piece and this of course depends upon the size of the tire.

The individual plates should be molded or curved both transversely and longitudinally to coincide with the inside of the casing when the inner tube is inflated to its full extent. The thickness of the metal of which the plates are composed will depend upon the weight and size of the tire. I have found from practice that when used with ordinary tires the plates should be approximately three inches in length, and the portion 6 constituting the hinge joint is curved to conform to the circumferential curve of the tire, but the pintle passage through said joint is straight to permit of free movement at that locality.

The two series of plates are disposed on each side of the medial line and riveted to a continuous strip of canvas 9, corresponding in width to the inside of the shoe and to be clenched at the edges with the shoe by the clencher ring. They are provided with suitable rivet orifices for the passage of the rivets 10, and are secured with their hinge portions in alinement to receive a continuous pintle 11, which should of course be of material sufficiently flexible as to adapt itself to the arc of the tire and to any variation thereof during the travel of the same. The pintle may be readily made of malleable wire. By reference to Figs. 2 and 6, it will be seen that the exposed ends of the plates may either overlap the adjacent plates in one direction on one side of the pintle 11, and in a reverse direction on the other side of the pintle (as in Fig. 6) or that the plates on both sides of the pintle may overlap in the same direction as in Fig. 2. The pintle 11 constitutes in itself a full protection against puncture at the juncture of the hinge sections.

The thickness of the canvas strip may be such as experience may dictate, and an independent strip may be used inside of that to which the plates are riveted, as shown in Fig. 3.

From the construction shown and described, it will be seen that whenever a wheel strikes an uneven place in the road and the tire is dented or flattened at any point, the air in the inner tube will find no resistance in straightening the armor out again, and the pintle being pliable will likewise yield to the air pressure. If the tire should lose air and become soft, the character of the pintle will permit the armor to likewise flatten or conform to the tire.

While I prefer to lap the plates as shown and described, it will be understood that each series of the plates may lap each other in the same direction as shown in Fig. 6 without departing from the spirit of my invention. Likewise, while I have shown one end of the plates overlapping the end of the adjacent plate, it will be understood that if desirable the underlying end of the plate may be depressed as shown in Fig. 7 to constitute a seat for the overlapping end, so that the exterior surface may not be interrupted by any projection.

I do not wish to be confined to any particular material of which the plates are made as the selection should have in mind only the puncture proof characteristic.

What I claim as new and desire to secure by Letters Patent is:

1. An armor for pneumatic tires comprising a flexible annular base, two longitudinally extending series of metallic plates, each plate being connected to the base, said series of plates being disposed on each side of the median line of the base, each plate at its middle and for a distance substantially one-third of its length being formed with a hinge bead, the hinge beads of the plates on one side of said median line coacting with and being in alinement with the hinge beads of the plates on the other side of said median line, the plates of each series having overlapping engagement with each other, and a pintle passing through the hinge beads of the two series of plates and holding them in hinged engagement with each other.

2. An armor for pneumatic tires comprising a flexible annular base, two longitudinally extending series of metallic plates, each plate being connected to the base, said series of plates being disposed on each side of the median line of the base, each plate at its middle and for a distance substantially one-third of its length being formed with a hinge bead, the hinge beads of the plates on one side of said median line coacting with and being in alinement with the hinge beads of the plates on the other side of said median line, the edge of each plate on each side of the bead being inclined outward or toward the outside edge of the plate, the plates of each series having overlapping engagement with each other, and an endless flexible pintle passing through the hinge beads of the two series of plates and holding them in hinged engagement with each other.

In testimony whereof I hereunto affix my signature in the presence of two witnesses.

ASCHER L. McNAGHTEN.

Witnesses:
   AMOS N. GOODMAN,
   A. H. ABRAHAMSON.